Feb. 10, 1953  G. M. RHODEEN  2,628,128
CROP SPRAYING MACHINE
Filed Aug. 14, 1950  4 Sheets-Sheet 1

George M. Rhodeen
INVENTOR.

BY Clarence A. O'Brien
and Harvey B. Jacobson
Attorneys

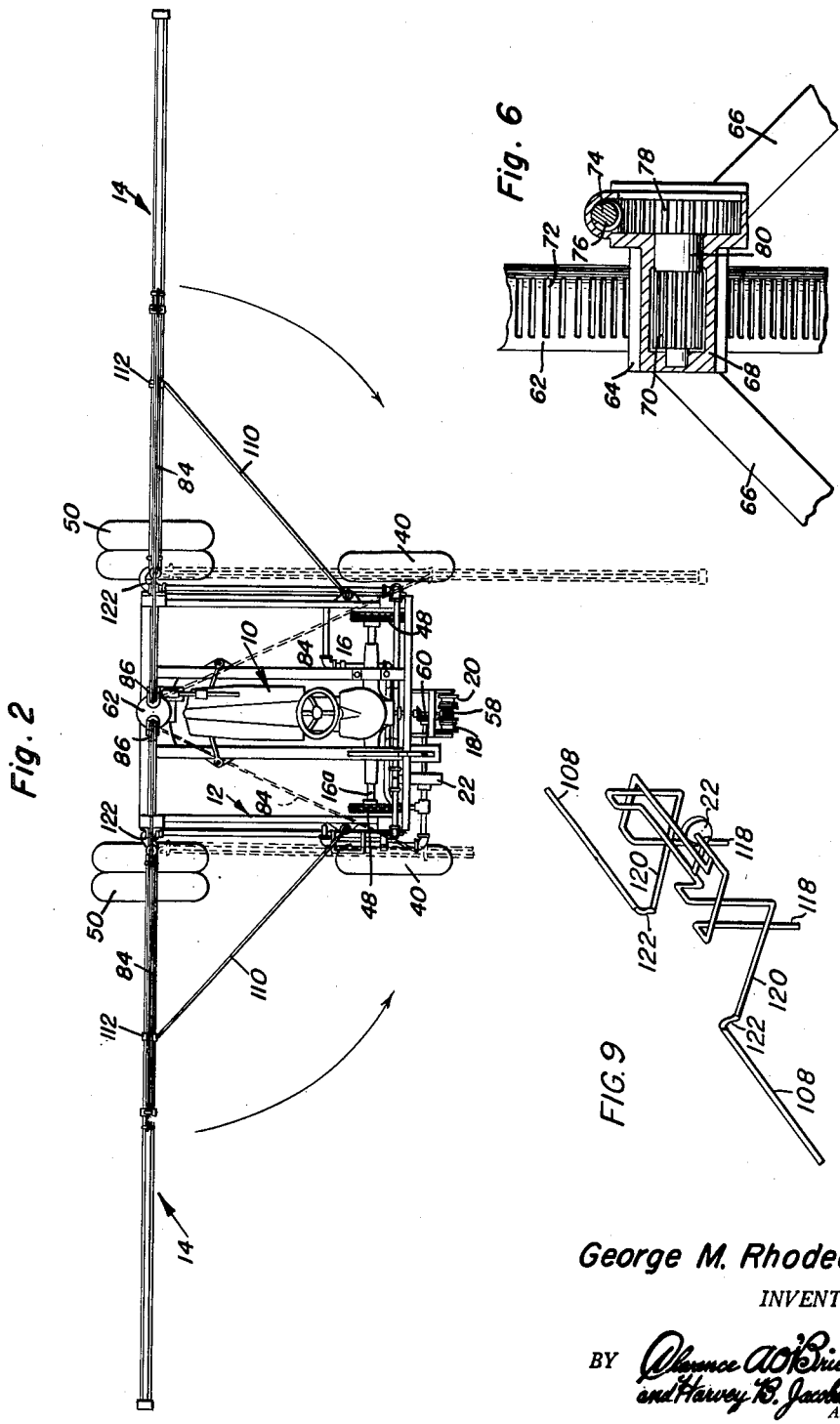

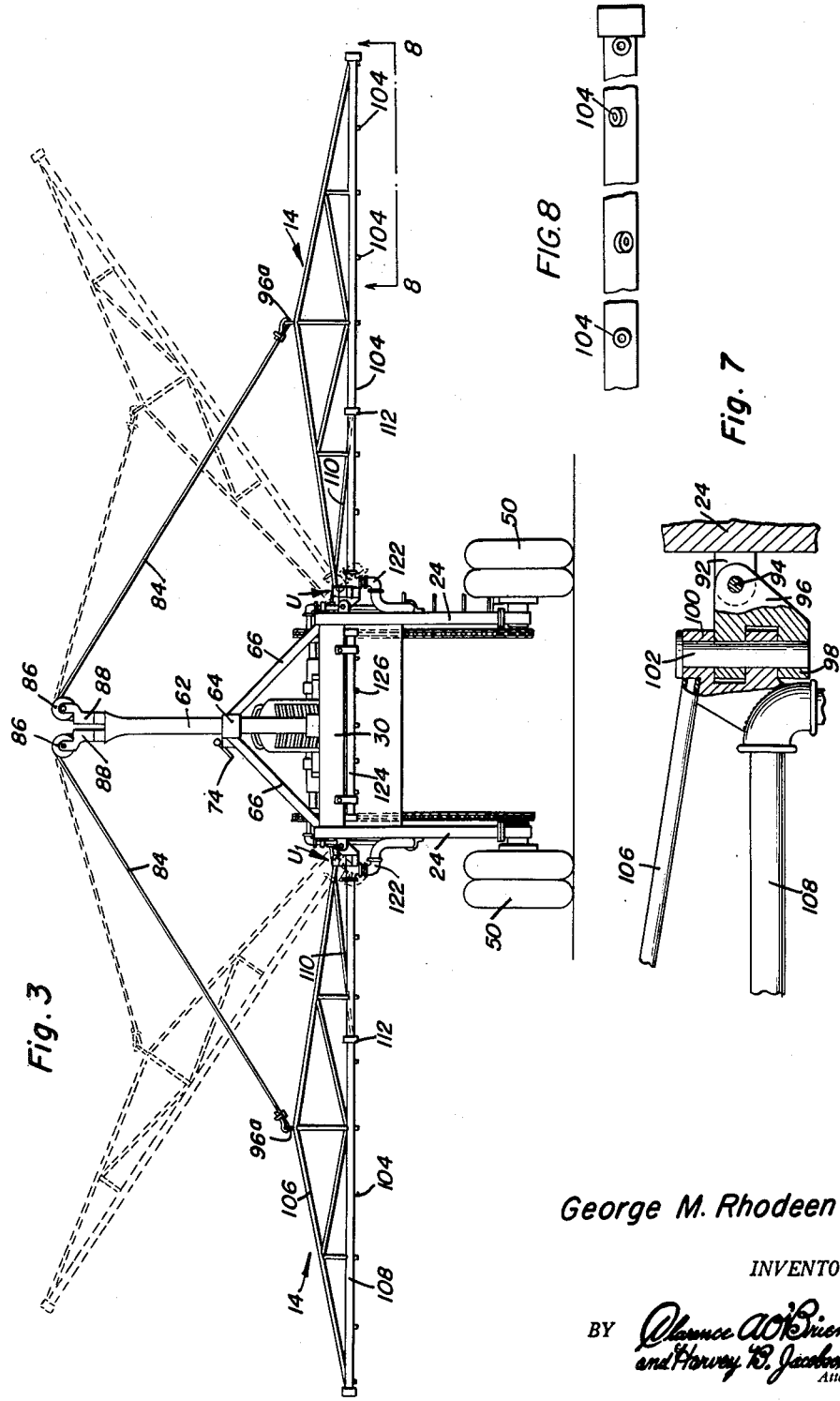

Feb. 10, 1953 G. M. RHODEEN 2,628,128
CROP SPRAYING MACHINE
Filed Aug. 14, 1950 4 Sheets-Sheet 4
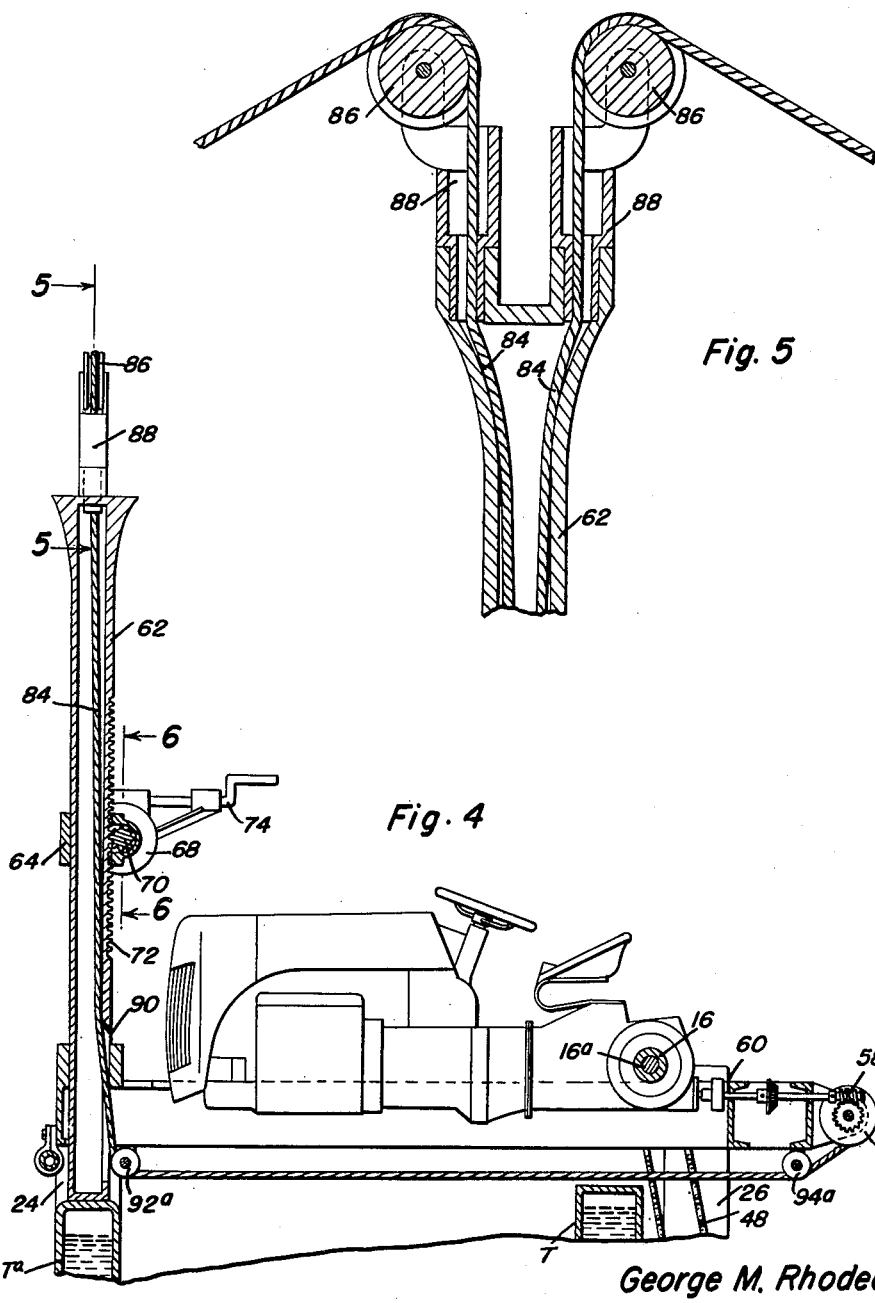
George M. Rhodeen
INVENTOR.

Patented Feb. 10, 1953

2,628,128

UNITED STATES PATENT OFFICE 2,628,128

CROP SPRAYING MACHINE

George M. Rhodeen, Canon City, Colo.

Application August 14, 1950, Serial No. 179,287

8 Claims. (Cl. 299—41)

This invention relates to new and useful improvements in crop spraying devices and the primary object of the present invention is to provide a crop spraying machine including a wheeled frame having a tractor assembly mounted thereon and elevated approximately six feet above the ground and constituting the necessary means to permit movement of the frame, steering of the frame and power means for operating a pump that will impel fluid through spray booms mounted on the frame.

Another important object of the present invention is to provide a crop spraying machine involving a pair of spray booms that are swiveled to the frame and which are selectively raised and lowered by a means operated by the tractor assembly mounted on the frame to prevent damage to the booms from obstructions in the path of the booms as the machine is turned to begin spraying another row of crops.

Yet another object of the present invention is to provide a crop spraying machine including a wheeled frame and a pair of tanks forming a unitary part of the frame to reinforce and strengthen the frame.

Another object of the present invention is the provision of a crop spraying machine using a tractor assembly of standard make that will provide the means for operating a spray pump, a mechanism for raising and lowering spray booms, and a driving and steering means for the machine, and without in any way harmfully effecting the tractor, since the only alteration necessary is to remove the tractor wheels and provide extensions for the rear axle of the tractor assembly.

Another object of the present invention is to provide a spray machine of knock down construction for convenience in shipping and which may be quickly and readily assembled or disassembled in a minimum time.

A further object of the present invention is to provide a crop spraying machine including spray booms that are swiveled to the frame and which may be raised, lowered or swung against the sides of the frame together with a locking device that will position the booms in their proper location in their extended position.

A still further aim of the present invention is to provide a crop spraying machine that is simple and practical in construction, strong and reliable in use, efficient and durable in operation, inexpensive to manufacture, service and operate, and otherwise well adapted for the purposes for which the same is intended.

Other objects and advantages reside in the details of construction and operation as more fully hereinafter described and claimed, references being had to the accompanying drawings forming part hereof, wherein like numerals refer to like parts through, and in which:

Figure 2 is a top plan view of Figure 1 and showing, in dotted lines, the spray booms swung against the sides of the frame;

Figure 3 is a front elevational view of Figure 1 and with dotted lines showing the spray booms partially raised;

Figure 4 is an enlarged, fragmentary, longitudinal vertical sectional view taken substantially through the center of Figure 2;

Figure 5 is an enlarged detail vertical sectional view taken substantially on the plane of section line 5—5 of Figure 4;

Figure 6 is an enlarged detail vertical sectional view taken substantially on the plane of section line 6—6 of Figure 4;

Figure 7 is a detail view showing the manner in which the spray booms are attached to the frame;

Figure 8 is an enlarged detail view taken substantially on the plane of section line 8—8 of Figure 3; and Figure 9 is a diagrammatic view showing the manner in which the spray pump is operatively connected to the spray booms.

Figure 1:
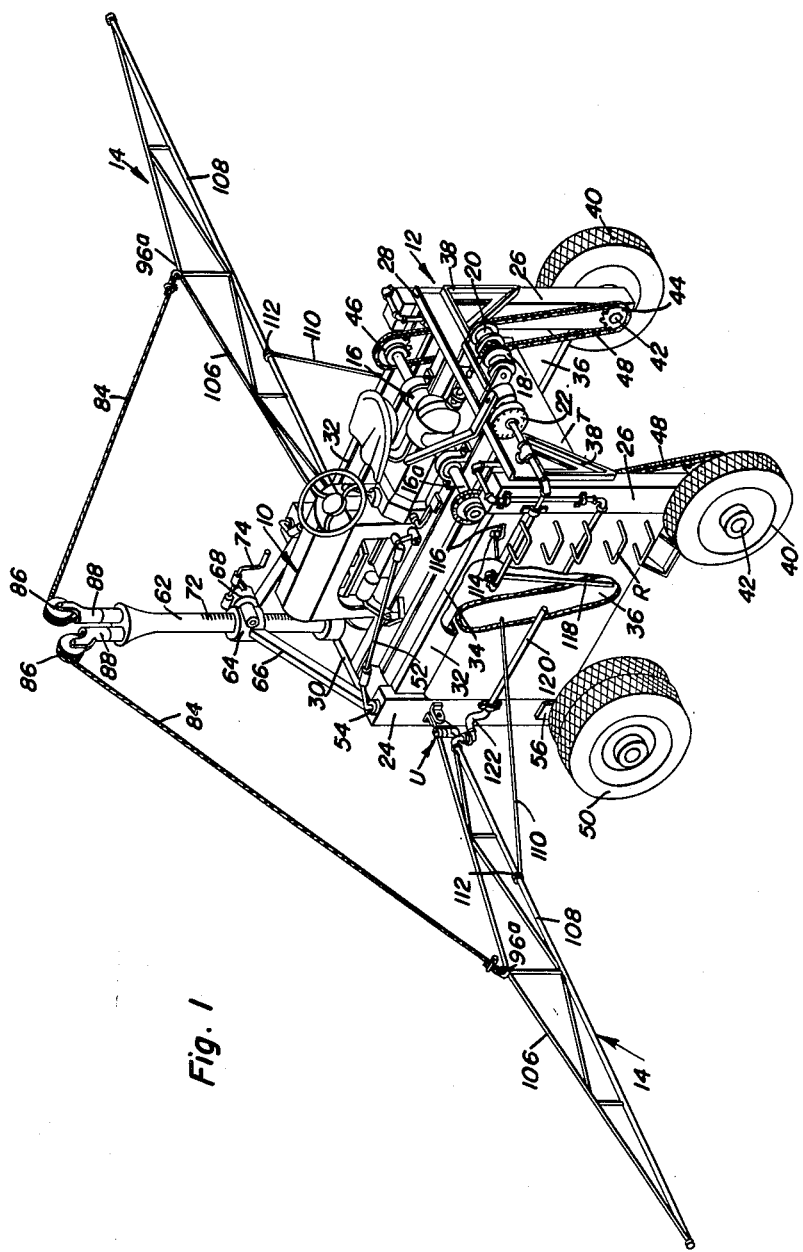
Figure 1 is a perspective view of the present invention and showing the spray booms extended for use.

Referring now to the drawings in detail, wherein for the purpose of illustration, there is disclosed a preferred embodiment of the present invention. The device consists of three major components, namely, a complete tractor assembly 10 except for the front and rear wheel assemblies, a four cornered frame 12 supporting the tractor assembly above the ground sufficiently to clear all ordinary row crops, and adjustable and swiveling spray booms 14 that are mounted on the frame.

The tractor assembly 10 is a complete unit, of standard make, with the possible exception of extra length rear axles 16 and alterations to make it suitable for mounting on the four-cornered frame 12 in a suitable position. The original steering drag will be altered and provisions are made for operating the spray boom winches or drums 18 and 20 and a pump 22 from separate power take-offs incorporated into the tractor design. The tractor may be removed from the frame, its wheel assemblies replaced, and it may then be used for general work.

The frame 12 includes a forward pair of vertical members or columns 24 and a rear pair of vertical members or columns 26. The rear columns 26 are joined by a rear cross-beam 28 and the forward columns 24 are joined by a forward cross-beam 30. The forward and rear columns are joined by side beams 32 and the cross-beams are joined by a pair of intermediate longitudinal beams 34.

Spray tanks 36 also join the forward and rear columns and are attached to the side beams. The tanks 36 constitute a unitary part of the frame providing extraordinary strength to the frame. The rear columns are joined to the rear cross-beam and the forward columns are joined to the forward cross-beam by suitable corner braces or gussets 38.

The rear wheels 40 of the frame 12 are supported on stub axles 42 extending horizontally through the lower ends of the rear columns 26. The inner ends of the axles 42 carry sprockets 44 that are connected to sprockets 46 on the rear axle extensions 16a by sprocket chains 48. The sprockets 44 and 46 may be so located as to permit the chains 48 to travel between the spray tanks, as shown, or be located on the outsides of the spray tanks.

The dual front wheels 50 of the frame are steered through an adequate turn angle by torque rods 52 connected to the steering mechanism of the tractor assembly. The forward ends of the rods 52 are coupled to vertical turn bars 54 that extend through or along side of the forward columns and whose lower ends are connected to standard spindles and king pins in castings 56 at the lower ends of the front wheel columns.

The dual spray boom winches 18, 20 and the hydraulic pressure pump 22 are mounted on the rear cross-beam 28. The winches have control over the booms 14 and are capable of either lowering or raising the booms under power. This is accomplished by forward and reverse clutching of a worm gear drive 58 connected to the two winches through the conventional power take-off clutch of the tractor. The hydraulic pressure pump 22 is started from the operator's position by engaging a clutch 59 on the power take-off extension 60 of the tractor assembly.

A hollow or tubular mast 62 rises vertically out of the frame and forwardly of the tractor assembly. A guide sleeve 64 is braced to the forward cross-beam 30 by arms 66 and the guide sleeve 64 slidably receives the mast 62. A gear housing 68 is secured to the sleeve 64 and supports therein a gear 70 that meshes with a gear 78. The gears 70 and 78 are mounted on a common shaft 82.

As the crank handle is rotated in one direction, the mast will be raised whereas rotation of the crank handle in an opposite direction will lower the mast. Any suitable means may be employed for locking the crank handle in a selected rotated position, such as a ratchet and pawl.

Two spray boom cables 84 extend upwardly through the mast 62 and are trained over pulleys 86 mounted on the upper bifurcated arms 88 whose lower ends are secured to the upper end of the mast. The cables 84 extend through a vertical slot 90 in the lower end of the mast, are trained over forward and rear guide pulleys 92a and 94a on the underside of the frame and are anchored to the winches. The forward ends of the cables are anchored to rings 96a intermediate the ends of the spray booms 14.

When the spray booms are swiveled to the frame, by the unit U, as shown in Figure 7, the arms 88 include upper and lower sections with the upper sections rotatably supported in the lower sections to permit swinging of the spray booms against the sides of the frame. However, if vertical hinges are employed for affixing the spray booms to the frame then the arms 88 may be of one piece construction.

The means for attaching the spray booms to the frame is shown in Figure 7 and comprises fulcrum ears 92 supporting horizontal pins 94 that extend through attaching ears 96 on knuckle members 98. The knuckles of the member 98 are interdigitated with knuckles 100 on the inner ends of the spray booms and vertical pins 102 extend through the interdigitated knuckles.

The spray booms will extend horizontally to either side of the device for a distance of fifteen to fifty feet and incorporates spray nozzles 104 certain of which incline forwardly, others of which face downwardly and still others incline rearwardly. Alternatively, the nozzles may face deflectors for directing the fluid streams effectively over the crops.

The spray booms may be designed with Shelby tubing 106 or other types of bracing constituting standard truss arrangements. A sheet steel box beam or lattice girder may be the structural member of the spray boom. Any design of plates, sheets or strips or tubing using the pipe 108 itself as a structural member is also included as an alternate design.

Means is provided for bracing the booms and for holding the booms extended and horizontal. This means comprises elongated rods 110 having terminal eyes 112 that embrace the pipes 108. Laterally projecting lugs 114 at the rear ends of the rods 110 removably enter apertures in ears 116 fixed to the tanks 36.

Conduits 118 enter the tanks 36 and are connected to the suction side of pump 22 and additional conduits 120 extend from the outlet side of pump 22 and are coupled to the pipes 108 by flexible tubes 122.

In practical use of the present invention, the tractor assembly is operated by the driver for the moving, steering and braking of the machine. The booms are selectively raised and lowered by the power take-off of the tractor and may be raised by the manually operated means applied to the mast.

A horizontal spray pipe 124 is mounted on the frame between the forward columns and includes spray nozzles 126 similar to nozzles 104. The pipe 124 is connected to the conduits 118 or the conduits 120 to effectively spray crops located between the wheels 50.

Means is provided whereby an operator may mount the tractor seat. This means assumes the form of a ladder mounted at any suitable position on the machine or rungs R attached to one or both of the side tanks 36.

A rear relatively short tank T is mounted between the upper ends of the rear columns 24 and a relatively short forward tank Ta is mounted between the upper ends of the forward columns 24. The tanks T and Ta communicate with the dispersing tubes or conduits in any suitable manner and are so located as not to engage crops over which the machine is traveling.

Having described the invention, what is claimed as new is:

1. A crop spraying machine comprising a tractor assembly having a steering mechanism, a power take-off and a rear axle, an elongated frame supporting the tractor assembly in an elevated position, a rear pair of wheels carried by the frame, means operatively connecting the rear wheels to the rear axle, a forward pair of wheels carried by the frame, means operatively connecting the forward wheels to the steering mechanism, the axes of rotation of said forward and rear wheels being considerably lower than the axis of said rear axle, a pump mounted on the frame and operatively connected to the power take-off, a pair of tanks mounted on and forming a unitary part of the frame and reinforcing and strengthening the frame, conduits leading from the pump to the tanks, a pair of spray booms, universal connections between said spray booms and said frame, means carried by the frame and connected to the booms for selectively raising and lowering the booms as a unit, means bracing the booms to the frame and retaining the booms at right angles to the frame, and further conduits connecting the outlet side of said pump to said spray booms.

2. The combination of claim 1 wherein said frame includes forward and rear pairs of columns, said tanks extending between and being secured to said forward and rear columns.

3. A crop spraying machine comprising a four-column frame including forward and rear pairs of columns, a rear pair of wheels mounted on the lower ends of the rear columns and a forward pair of wheels mounted on the lower ends of the forward columns, power means on the frame and operatively connected to the rear wheels, steering means associated with the frame and connected to the forward wheels, spray booms carried by the frame, means mounted on the frame and connected to the booms for selectively raising and lowering the booms, a pair of tanks extending between and secured to said forward and rear columns and reinforcing and strengthening the frame, and means mounted on the frame for impelling liquid from the tank to the spray booms.

4. The combination of claim 3 and a horizontal spray tube extending between said forward columns and connected to said impelling means to water crops between the forward columns.

5. A crop spraying machine comprising a four-column frame including forward and rear pairs of columns, a rear pair of wheels mounted on the lower ends of the rear columns and a forward pair of wheels mounted on the lower ends of the forward columns, power means on the frame and operatively connected to the rear wheels, steering means associated with the frame and connected to the forward wheels, a pair of elongated spray booms, swivels securing said booms to the forward columns, means mounted on the frame and connected to the spray booms for selectively raising and lowering the booms, means bracing the booms to the frame and retaining the booms transversely of the frame, a pair of tanks joining the forward column to the rear columns and forming a unitary part of the frame, and pump means on the frame and forming a connection between the tanks and the booms for impelling fluid from the tanks to the booms.

6. The combination of claim 5 wherein said means for selectively raising and lowering the booms comprises a cable drum rotatably mounted on the frame, a vertical and hollow mast carried by the frame, and cables attached to the drum trained through the mast and attached to the booms.

7. The combination of claim 6 wherein said mast is vertically movable, and manually operated means engaging said mast for selectively raising and lowering the mast.

8. In combination with a tractor assembly having a power take-off, a spraying machine comprising a frame supporting the tractor assembly, a rear pair of wheels on the frame and operatively connected to the rear axle of the assembly, a pair of forward steering wheels on the frame and operatively connected to the steering mechanism of the tractor, a pair of spray booms carried by the frame, a pair of tanks forming a unitary part of the frame and reinforcing and strengthening the frame, and impelling means operatively connected to the power take-off of the tractor assembly and forming a connection between the tanks and the booms for impelling fluid from the tanks to the booms.

GEORGE M. RHODEEN.

REFERENCES CITED

The following references are of record in the file of this patent:

UNITED STATES PATENTS

| Number | Name | Date |
| --- | --- | --- |
| 1,634,701 | Williams | July 5, 1927 |
| 1,943,655 | Cummings | Jan. 16, 1934 |
| 2,184,198 | Seeber | Dec. 19, 1939 |
| 2,221,433 | Pinter | Nov. 12, 1940 |
| 2,424,468 | Keathley | July 22, 1947 |
| 2,504,403 | Finley | Apr. 18, 1950 |
| 2,548,482 | Kouril | Apr. 10, 1951 |
| 2,575,521 | Ireland | Nov. 20, 1951 |